United States Patent
Hargreaves

(10) Patent No.: US 9,933,867 B2
(45) Date of Patent: Apr. 3, 2018

(54) ACTIVE PEN CAPACITIVE DISPLACEMENT GAUGE

(71) Applicant: Synaptics Incorporated, San Jose, CA (US)

(72) Inventor: Kirk Hargreaves, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 64 days.

(21) Appl. No.: 14/985,046

(22) Filed: Dec. 30, 2015

(65) Prior Publication Data

US 2017/0192533 A1    Jul. 6, 2017

(51) Int. Cl.
  *G06F 3/038* (2013.01)
  *G06F 3/0354* (2013.01)

(52) U.S. Cl.
  CPC ........ *G06F 3/0383* (2013.01); *G06F 3/03545* (2013.01)

(58) Field of Classification Search
  CPC .... G06F 3/033; G06F 3/0383; G06F 3/03545; H01G 5/00; H01G 5/0136; H01G 5/04; H01G 5/14; H01G 5/019; H01G 5/16; H01G 7/00; H03K 17/975; G01B 7/14; G01B 7/16; G01R 27/26
  See application file for complete search history.

(56) References Cited

U.S. PATENT DOCUMENTS

| | | | |
|---|---|---|---|
| 3,928,796 A | 12/1975 | Kaiser | |
| 4,562,742 A | 1/1986 | Bell | |
| 4,914,543 A * | 4/1990 | Carroll | G01D 5/2412 361/294 |
| 5,270,664 A | 12/1993 | McMurtry et al. | |
| 5,861,754 A * | 1/1999 | Ueno | B82Y 35/00 324/660 |
| 6,145,384 A | 11/2000 | Ikeda et al. | |
| 6,683,780 B2 | 1/2004 | Thomas et al. | |
| 7,114,399 B2 | 10/2006 | Mallory | |
| 9,048,023 B2 * | 6/2015 | Liang | H01G 5/013 |
| 2004/0246653 A1 * | 12/2004 | Williams | H01G 5/14 361/277 |
| 2012/0256830 A1 * | 10/2012 | Oda | G06F 3/03545 345/157 |
| 2013/0106794 A1 | 5/2013 | Logan et al. | |
| 2013/0141398 A1 | 6/2013 | Cho et al. | |
| 2014/0009863 A1 | 1/2014 | Obata | |
| 2014/0062967 A1 | 3/2014 | Lu et al. | |
| 2014/0266256 A1 | 9/2014 | Cagdaser et al. | |
| 2016/0048225 A1 * | 2/2016 | Curtis | G06F 3/044 345/173 |
| 2016/0162045 A1 * | 6/2016 | Vincent | G06F 3/03545 345/179 |

* cited by examiner

*Primary Examiner* — Jennifer Mehmood
*Assistant Examiner* — Sardis F Azongha
(74) *Attorney, Agent, or Firm* — Osha Liang LLP

(57) ABSTRACT

An active capacitive pen including: a tip; a first electrode mechanically connected to the tip that displaces in response to a force applied to the tip; a second electrode that is isolated from the tip, where the first electrode and the second electrode are of different types (e.g., transmitter electrode, receiver electrode); and a measurement module that detects a change in capacitance resulting from displacement of the first electrode relative to the second electrode.

17 Claims, 4 Drawing Sheets

US 9,933,867 B2

ACTIVE PEN CAPACITIVE DISPLACEMENT GAUGE

FIELD

This invention generally relates to electronic devices.

BACKGROUND

An active pen (also referred to as active stylus) is an input device that allows users to interact with touchpads and touchscreens of computing devices (e.g., a smartphone, a tablet computer, a laptop computer, a desktop personal computer (PC), a kiosk, etc.). The active pen has electronic components that collect and wirelessly communicate information regarding the status of the pen (e.g., buttons on the active pen that are selected, location of the active pen, pressure on the tip of the active pen, etc.) The computing device may perform different functions depending on the status of the active pen.

SUMMARY

In general, in one aspect, embodiments of the invention relate to an active capacitive pen. The active capacitive pen comprises: a tip; a first electrode mechanically connected to the tip that displaces in response to a force applied to the tip; a second electrode that is isolated from the tip, wherein the first electrode and the second electrode are of different types selected from a group consisting of a transmitter electrode and a receiver electrode; and a measurement module that detects a change in capacitance resulting from displacement of the first electrode relative to the second electrode.

In general, in one aspect, embodiments of the invention relate to a method for operating an active pen comprising a tip. The method comprises: driving a transmitter signal on a first transmitter electrode of the active pen; receiving a resulting signal on a first receiver electrode of the active pen, wherein the resulting signal is based on the transmitter signal and a capacitance between the first transmitter electrode and the first receiver electrode; and detecting, during application of a force to the tip, a change in the capacitance resulting from displacement of one selected from a group consisting of the first transmitter electrode and the first receiver electrode mechanically connected to the tip.

In general, in one aspect, embodiments of the invention relate to a capacitive displacement gauge. The capacitive displacement gauge comprises: a contact point; a first electrode mechanically connected to the contact point that displaces in response to a force applied to the contact point; a second electrode that is isolated from the contact point, wherein the first electrode and the second electrode are of different types selected from a group consisting of a transmitter electrode and a receiver electrode; and a measurement module that detects a change in capacitance resulting from displacement of the first electrode relative to the second electrode.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide capacitive displacement gauges and methods for their use in electronic systems such as mobile devices and active pens.

Figure 1:
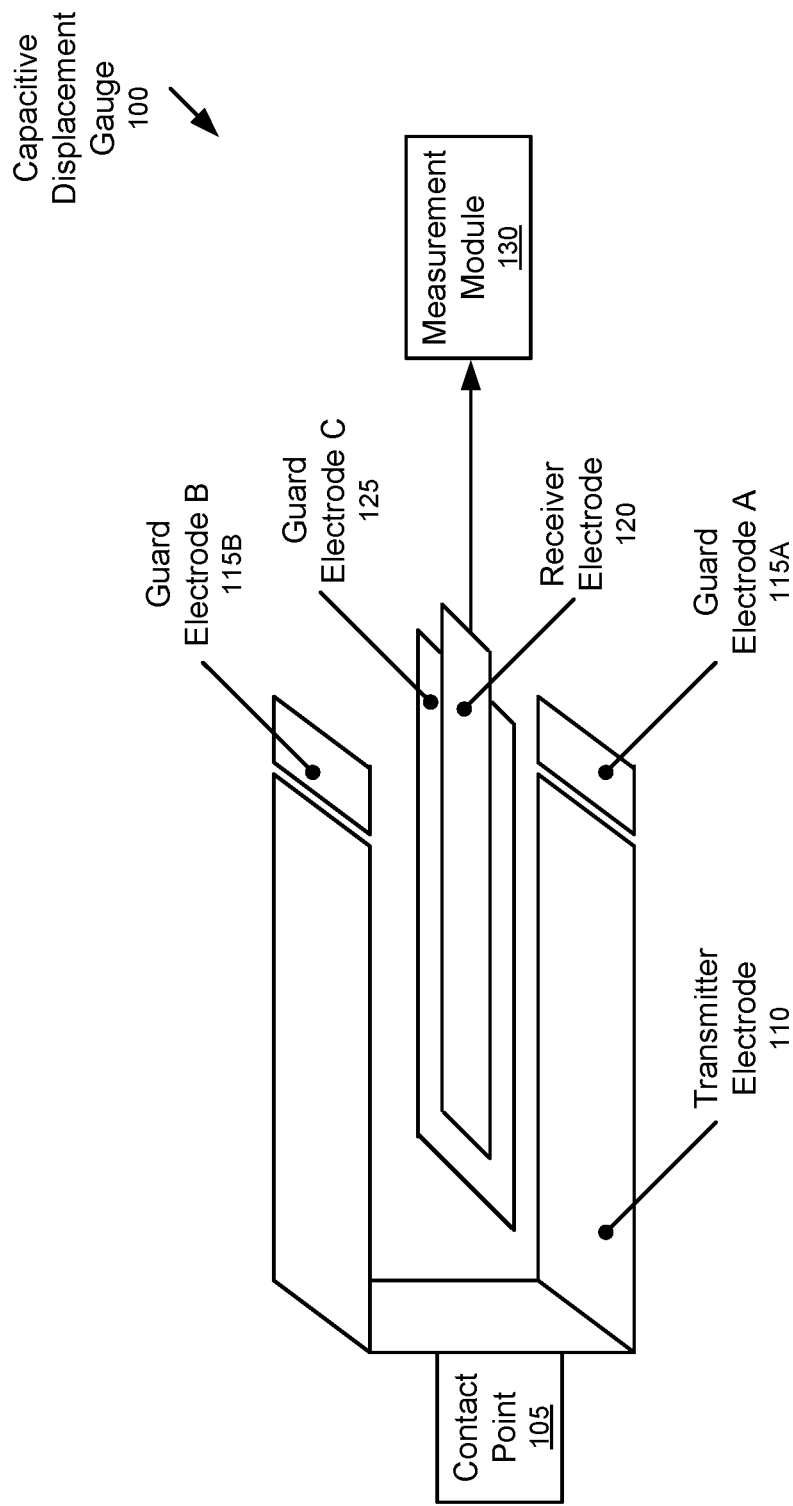
FIG. 1 shows an capacitive displacement gauge in accordance with one or more embodiments.

FIG. 1 shows a capacitive displacement gauge (100) in accordance with one or more embodiments. As shown in FIG. 1, the capacitive displacement gauge (100) includes a contact point (105), a transmitter electrode (110), a receiver electrode (120), multiple guard electrodes (i.e., Guard Electrode A (115A), Guard Electrode B (115B), Guard Electrode C (125)), and a measurement module (130). The capacitive displacement gauge (100) may be located within an electronic device (e.g., an active pen, a mobile phone, etc.).

In one or more embodiments, the capacitive displacement gauge (100) includes the contact point (105). The contact point (105) corresponds to a volume composed of any material (e.g., metal alloy, plastic, wood, or combinations thereof, etc.) against which a force may be applied. Further, the contact point (105) may be of any size and have a cross-section of any shape. For example, the contact point (105) may be a knob, a tip, a spring, a button, etc.

In one or more embodiments, the capacitive displacement gauge (100) includes the transmitter electrode (110) and the receiver electrode (120). The transmitter electrode (110) and the receiver electrode (120) may be composed of the same or different material (i.e., metal or metal alloys). As shown in FIG. 1, the transmitter electrode (110) partially encapsulates (i.e., wraps around) the receiver electrode (120). Specifically, the transmitter electrode (110) may include three rectangular portions. Other shapes are also possible. One of the portions is mechanically connected, either directly or indirectly, to the contact point (105). The other two portions are located above or below the receiver electrode (120) and overlap, at least partially, with the receiver electrode (120). In some embodiments, transmitter electrode (110) may comprise two or more electrically isolated transmitter electrodes, each driven with its own capacitive sensing signal.

In one or more embodiments, the transmitter electrode (110) is mechanically connected to the contact point (105). Accordingly, if a force is applied to the contact point (105) (e.g., the contact point (105) is pressed against a surface), the contact point (105) and the transmitter electrode (110) will displace. In one or more embodiments of the invention, the receiver electrode (120) is isolated from the contact point (105). In other words, if a force is applied to the contact point (105), the contact point (105) and the transmitter electrode (110) will displace, but the receiver electrode (120) will remain approximately stationary.

In one or more embodiments, a transmitter signal is driven onto the transmitter electrode (110) and a resulting signal is received by the receiver electrode (120). Those skilled in the art, having the benefit of this detailed description, will appreciate that a capacitance exists between the transmitter electrode (110) and the receiver electrode (120). This capacitance is a component of the resulting signal. If the transmitter electrode (110) were to displace relative to the receiver electrode (120) (e.g., in response to a force applied to the contact point (105)), there would be a change in the capacitance and thus a change in the resulting signal. Moreover, if the displacement is in response to an applied force, the magnitude of the applied force may be determined based on the measured change in the capacitance and/or measured change in the resulting signal.

In one or more embodiments, the capacitive displacement gauge (100) includes multiple guard electrodes (115A, 115B, 125). The guard electrodes (115A, 115B, 125) may be composed of the same or different material (e.g., metal alloys). In one or more embodiments, both guard electrode A (115A) and guard electrode B (115B) are adjacent to the transmitter electrode (110). Both guard electrode A (115A) and guard electrode B (115B) are mechanically connected to the contact point (105). In other words, like the transmitter electrode (110), guard electrode A (115) and guard electrode B (115B) displace in response to a force applied to the contact point (105). In one or more embodiments, the receiver electrode (120) is surrounded, at least partially, by guard electrode C (125). Guard electrode C (125) is isolated from the contact point (105). In other words, like the receiver electrode (120), guard electrode C (125) will remain approximately stationary if a force is applied to the contact point (105). A guard signal may be driven onto one or more of the guard electrodes (115A, 115B, 120). The guard signal may be driven by the same transmitter that drives a transmitter signal onto the transmitter electrode (110). Additionally or alternatively, the guard signal may be driven by a different transmitter than the transmitter that drives the transmitter signal onto the transmitter electrode (110). In some embodiments, the guard electrodes may be driven with a constant voltage. In other embodiments, the guard electrodes may not be driven with a voltage, and instead electrically float. In a system with multiple guard electrodes, the electrodes may have any combination of being driven with one or more signals and being allowed to electrically float.

In one or more embodiments of the invention, the capacitive displacement gauge (100) includes the measurement module (130). The measurement module (130) may be implemented in hardware (i.e., circuitry), software, or any combination thereof. As shown in FIG. 1, the measurement module (130) inputs the resulting signal from the receiver electrode (120). The measurement module (130) is configured to detect a change in the capacitance resulting from displacement of the transmitter electrode (110) relative to the receiver electrode (120). Specifically, the measurement module (130) may detect the change in capacitance by detecting changes in the resulting signal. The measurement module (130) may calculate a magnitude of the applied force based on the measured change. The detected change in capacitance and/or the calculated force may be reported to an external system (not shown).

Although FIG. 1 shows the transmitter electrode (110) mechanically connected to the contact point (105) and the receiver electrode (120) isolated from the contact point (105), in other embodiments the transmitter electrode (110) and the receiver electrode (120) switch places. In other words, in one or more embodiments, the receiver electrode (120) is mechanically connected to the contact point (105) and the transmitter electrode (110) is isolated from the contact point (105).

Although FIG. 1 shows the transmitter electrode (110) as a single electrode with three portions (discussed above), in one or more embodiments, there may be two transmitter electrodes. One transmitter electrode may be located above the receiver electrode (120), and the other transmitter electrode may be located below the receiver electrode (120). Both transmitter electrodes may be mechanically connected to the contact point (105).

Figure 2A:
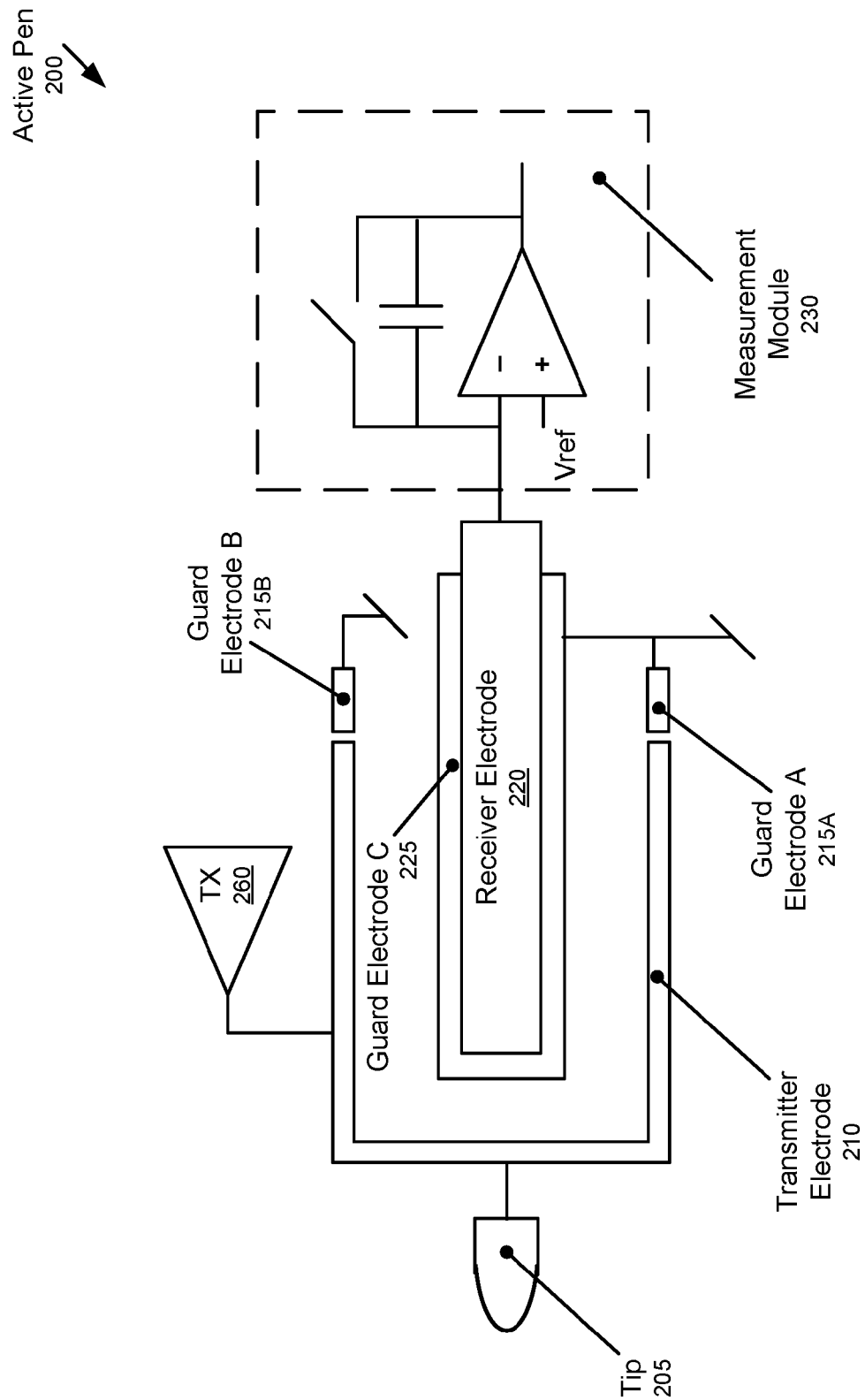
FIG. 2A and 2B show an active pen in accordance with one or more embodiments.

FIG. 2A shows an active pen (200) in accordance with one or more embodiments. The active pen (200) includes the capacitive displacement gauge (100), discussed above in reference to FIG. 1. As shown in FIG. 2A, the active pen (200) includes a tip (205), a transmitter electrode (210), a receiver electrode (220), multiple guard electrodes (Guard Electrode A (215A), Guard Electrode B (215B), Guard Electrode C (225)), and a measurement module (230). Each of these components (205, 210, 215A, 215B, 220, 225, 230) is discussed below.

In one or more embodiments, the transmitter electrode (210), the receiver electrode (220), the multiple guard electrodes (215A, 215B, 225), and the measurement module (230) are essentially the same as the transmitter electrode (110), the receiver electrode (120), the multiple guard electrodes (115A, 115B, 125), and the measurement module (130), respectively, discussed above in reference to FIG. 1. Moreover, the tip (205) is an example of the contact point (105), also discussed above in reference to FIG. 1.

As shown in FIG. 2A, the active pen (200) includes a transmitter (TX) (260) to drive a transmitting signal onto the transmitter electrode (210). The transmitter signal may be a square wave, a sinusoidal wave, or any type of signal. As also shown in FIG. 2A, the measurement module (230) includes an active amplifier to measure the resulting signal received from the receiver electrode (220). Additionally or alternatively, the measurement module (230) may include a capacitor with a shorting switch to detect changes in capacitance from the resulting signal received from the receiving electrode (220). As discussed above, changes in the resulting signal may be tied to changes in the capacitance between the transmitter electrode (210) and the receiver electrode (220). As also discussed above, the changes in capacitance may result from displacement (e.g., due to a force applied to the tip (205)) of the transmitter electrode (210) with respect to the receiver electrode (220). The output of the amplifier (or just the capacitor) may be demodulated in hardware or converted to a digital signal (e.g., ADC) and demodulated digitally. The measurement module (230) may report the change in capacitance and/or the magnitude of the applied force to other components (not shown) of the active pen (200). Moreover, these other components may wirelessly communicate the magnitude of the applied force, or some value corresponding to the detected/measured applied force, to other electronic devices external to the active pen (200).

Figure 2B:
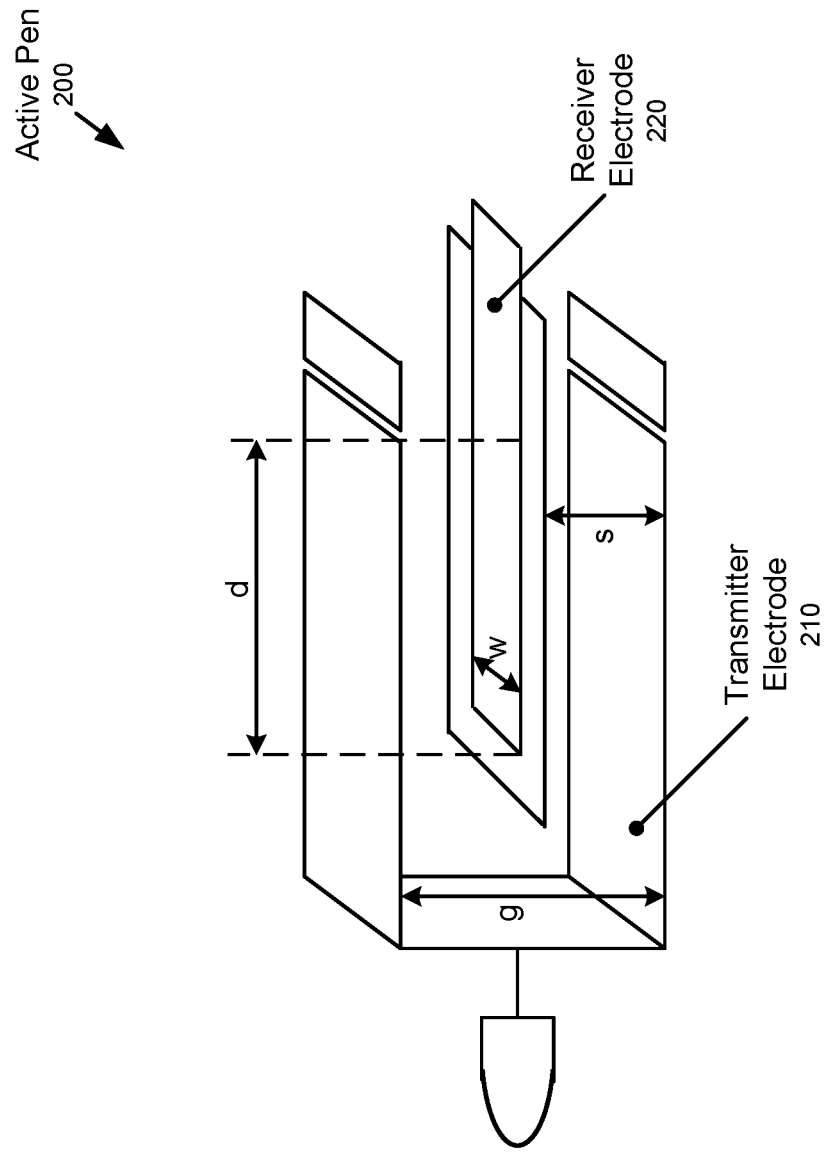

FIG. 2B shows various dimensions for the active pen (200). Those skilled in the art, having the benefit of this detailed description, will appreciate that by sandwiching the receiver electrode (220) between the two portions of the transmitter electrode (210), or vice-versa, and by utilizing guard electrodes (215A, 215B, 225), the gauge is very linear with displacement and is mostly insensitive to offset errors. The guard electrodes (215A, 215B, 225) ensure that parallel plate calculations apply to a greater degree than they would otherwise. In other words, the guard electrodes (215A, 215B, 225) effectively turn the disclosed configuration of the transmitter electrode (210) and receiver electrode (220) into a parallel plate capacitor.

In one or more embodiments, for the arrangement shown in FIG. 2B, the capacitances between the bottom plate and the receiver electrode ($C_{bot}$) and the top plate and the receiver electrode ($C_{top}$) are approximately:

$$C_{bot} = \frac{\varepsilon \varepsilon_0 w \cdot d}{s}$$

$$C_{top} = \frac{\varepsilon \varepsilon_0 w \cdot d}{g - t - s}$$

Where $\varepsilon$=the dielectric constant of air (~1); $\varepsilon_0$=dielectric constant −8.85 pF·m$^{-1}$=8.85 fF·mm$^{-1}$; w=width of the receiver electrode (e.g., 5 mm); d=overlap between transmitters and receiver electrode (e.g., 1-2 mm); s=distance between the bottom electrode and the bottom of the receiver electrode (e.g., 0.5 mm); g=gap between the top and bottom transmitter electrodes (e.g., 1 mm); and t=thickness of the receiver electrode.

If 1 mm of overlap and zero thickness is assumed, the nominal capacitance is $$C_{top} = C_{bot} = \frac{8.85 \text{ fF} \cdot \text{mm}^{-1} \cdot 5 \text{ mm} \cdot 1 \text{ mm}}{0.5 \text{ mm}} = 88.5 \text{ fF or } 177 \text{ fF total}.$$

And the change with displacement is $$\frac{dC_{top}}{dd} = 177 \frac{\text{fF}}{\text{mm}} = 0.177 \frac{\text{fF}}{\mu}$$

Driving a 40 Vpp signal on the pen tip (and therefore, the transmitter electrode(s)), we have a 7 pCpp signal. Using a 10 pF integrating capacitor, we get a voltage signal of 0.7 Vpp with a sensitivity of 0.7 mV/μ.

Gain Analysis

The total capacitance is $$C_{tot} = C_{bot} + C_{top} = \frac{\varepsilon \varepsilon_0 w \cdot d}{s} + \frac{\varepsilon \varepsilon_0 w \cdot d}{g - t - s} = \varepsilon \varepsilon_0 w \cdot d \left( \frac{1}{s} + \frac{1}{g - t - s} \right)$$

The capacitance gain with displacement is $$G = \frac{dC_{tot}}{dd} = \varepsilon \varepsilon_0 w \left( \frac{1}{s} + \frac{1}{g - t - s} \right)$$

Gain Sensitivity

Let us define s as $$s = (g - t)\left(\frac{1}{2} + \lambda\right) = g_0\left(\frac{1}{2} + \lambda\right)$$

and then $$g - t - s = g - t - (g - t)\left(\frac{1}{2} + \lambda\right) = (g - t)\left(\frac{1}{2} - \lambda\right) = g_0\left(\frac{1}{2} - \lambda\right)$$

So if λ=0, the receive electrode is exactly centered. Then $$C_{tot} = \varepsilon \varepsilon_0 w \cdot d \left( \frac{1}{g_0\left(\frac{1}{2} + \lambda\right)} + \frac{1}{g_0\left(\frac{1}{2} - \lambda\right)} \right) = \frac{\varepsilon \varepsilon_0 w \cdot d}{g_0}\left(\frac{1}{\frac{1}{4} - \lambda^2}\right)$$

And the gain is $$G = \frac{dC_{tot}}{dd} = \frac{\varepsilon \varepsilon_0 w}{g_0}\left(\frac{1}{\frac{1}{4} - \lambda^2}\right)$$

Note the gain can only go up due to displacement errors. This makes sense since the receiver electrode will always get closer to one transmitter electrode irrespective of direction.

Expected Gain Error

Assuming a gap of 1 mm, a plate thickness of 0.1 mm, and an offset error of 0.1 mm, so s, which is nominally 0.45 mm is 0.35 mm, then $$\lambda = \frac{s}{g_0} - \frac{1}{2} = \frac{0.35 \text{ mm}}{1 \text{ mm} - 0.1 \text{ mm}} - 0.5 = -0.11$$

The gain would then be off by 5%.

Targeted Gain Error

If we allow the gain to be off by 10%, then $$\left(\frac{1}{\frac{1}{4} - \lambda^2}\right) = (1 + \%) \cdot 4$$

Or $$\frac{1}{4} - \lambda^2 = \frac{1}{(1 + \%) \cdot 4}$$

$$\lambda^2 = \frac{1}{4} - \frac{1}{(1 + \%) \cdot 4} = \frac{1}{4} - \frac{1}{(1 + 0.1) \cdot 4} = 0.0227$$

$$\lambda = \pm 0.15$$

In this case $$s = (g - t)\left(\frac{1}{2} + \lambda\right) = (1 \text{ mm} - 0.1 \text{ mm})\left(\frac{1}{2} \pm 0.15\right) =$$
$$0.45 \text{ mm} \pm 0.135 \text{ mm} = 0.585 \text{ mm}, 0.315 \text{ mm}$$

Gain Sensitivity to Displacement Error

The sensitivity of the gain to displacement errors is $$\frac{dG}{d\lambda} = \frac{\varepsilon\varepsilon_0 w}{g_0} \frac{2\lambda}{\left(\frac{1}{4} - \lambda^2\right)^2}$$

Figure 3:
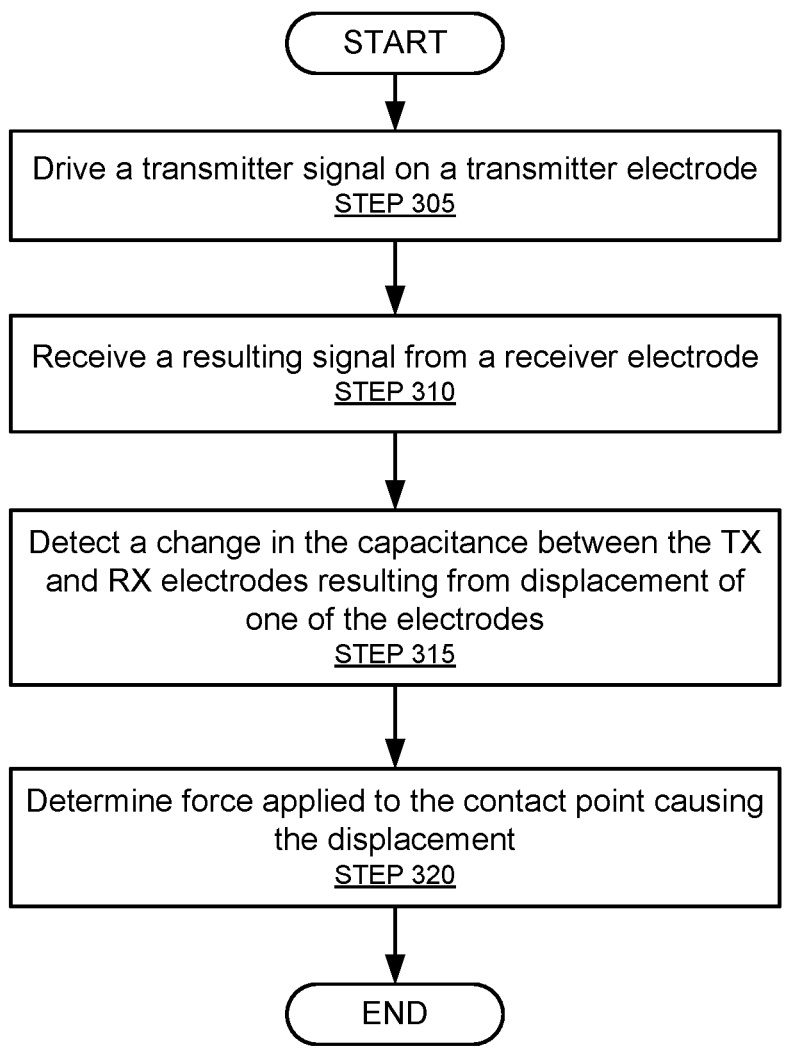
FIG. 3 shows a flowchart in accordance with one or more embodiments of the invention.

FIG. 3 shows a flowchart in accordance with one or more embodiments of the invention. The flowchart depicts a process for operating an active pen comprising a tip. One or more of the steps in FIG. 3 may be performed by the components of the active pen (200), discussed above in reference to FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a transmitter signal is driven on to a transmitter electrode (STEP 305). The transmitter signal may be a square wave, a sinusoidal wave, or any type of signal. Additionally or alternatively, the transmitter signal may be shared with other electronic components of the active pen. In one or more embodiments, the transmitter electrode is mechanically connected to the tip of the active pen and, like the tip, displaces if a force is applied to the tip.

In STEP 310, a resulting signal is received from a receiver electrode. The resulting signal may be received by a measurement module. The resulting signal is a function of at least the transmitter signal and the capacitance between the transmitter electrode and the receiver electrode. In one or more embodiments of the invention, the receiver electrode is sandwiched between different portions of the transmitter electrode. Additionally, the receiver electrode is isolated from the tip and does not displace, or displaces less, if a force is applied to the tip. In one or more embodiments, the transmitter electrode is sandwiched between different portions of the receiver electrode. Moreover, in such embodiments, the receiver electrode is mechanically connected to the tip while the transmitter electrode is isolated from the tip.

In STEP 315, a change in the capacitance between the transmitter electrode and the receiver electrode is detected. Specifically, the change in capacitance is the result of the transmitter electrode displacing, in response to a force applied to the tip of the active pen, relative to the receiver electrode. The change in the capacitance may be detected by a measurement module operatively connected to the receiver electrode. For example, the change in capacitance may be detected using an active amplifier that integrates the resulting signal. Additionally or alternatively, the change in capacitance may be detected using a capacitor with a shorting switch. Additionally or alternatively, the change in capacitance may be detected by demodulating the output of the amplifier (or just the capacitor) in hardware or converting the output to a digital signal (e.g., ADC) and then demodulated digitally.

In STEP 320, the force applied to the contact point (e.g., tip) is determined. In other words, from the detected change in capacitance, the magnitude of the applied force which caused the displacement and change in capacitance is determined. Specifically, the measurement module, or any other component, may access mappings in a data structure (e.g., array, lookup table, etc.) linking detected/measured capacitance changes to applied force magnitudes. The magnitude of the force or any value associated with the magnitude of the force may be wirelessly communicated by the active pen to any electronic component external to the active pen.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An active capacitive pen, comprising:
   a tip;
   a first electrode mechanically connected to the tip that displaces in response to a force applied to the tip;
   a second electrode that is mechanically isolated from the tip, wherein the first electrode and the second electrode are of different types selected from a group consisting of a transmitter electrode and a receiver electrode;
   a first guard electrode adjacent to the first electrode that displaces in response to the force, wherein the first guard electrode is configured to impose parallel-plate-capacitor-characteristics on a capacitor formed by the first electrode and the second electrode; and
   a measurement module that detects a change in capacitance resulting from displacement of the first electrode relative to the second electrode.

2. The active capacitive pen of claim 1, wherein the measurement module comprises an active amplifier used to measure a resulting signal from one selected from a group consisting of the first electrode and the second electrode.

3. The active capacitive pen of claim 1, further comprising:
   a transmitter that drives a transmitter signal onto the first electrode and a guard signal on to the first guard electrode,
   wherein the first electrode is a transmitter electrode, and
   wherein the second electrode is a receiver electrode connected to the measurement module.

4. The active capacitive pen of claim 1, wherein the measurement module comprises a capacitor with a shorting switch.

5. The active capacitive pen of claim 1, further comprising:
   a transmitter that drives a transmitter signal onto the second electrode,
   wherein the second electrode is a transmitter electrode, and
   wherein the first electrode is a receiver electrode.

6. The active capacitive pen of claim 1, further comprising:
   a third electrode mechanically connected to the tip that displaces in response to the force applied to the tip,
   wherein the first electrode and the third electrode are of the same type, and
   wherein the change in capacitance further results from displacement of the third electrode relative to the second electrode.

7. The active capacitive pen of claim 1, further comprising:
   a second guard electrode surrounding the second electrode that is isolated from the tip.

8. The active capacitive pen of claim 1, wherein the first electrode and the second electrode overlap by 2 mm.

9. The active capacitive pen of claim 1, wherein the first electrode and the second electrode are spaced by 0.5 mm.

10. A method for operating an active pen comprising a tip, comprising:

driving a transmitter signal on a first transmitter electrode of the active pen;

driving a first guard signal on a first guard electrode associated with the first transmitter electrode;

driving a second guard signal on a second guard electrode associated with a first receiver electrode, wherein the driving the first guard signal on the first guard electrode and the driving of the second guard signal on the second guard electrode imposes parallel-plate-capacitor-characteristics on a capacitor formed by the first transmitter electrode and the first receiver electrode;

receiving a resulting signal on the first receiver electrode of the active pen, wherein the resulting signal is based on the transmitter signal and a capacitance between the first transmitter electrode and the first receiver electrode; and detecting, during application of a force to the tip, a change in the capacitance resulting from displacement of one selected from a group consisting of the first transmitter electrode and the first receiver electrode mechanically connected to the tip.

11. The method of claim 10, further comprising:
determining a magnitude of the force based on the change in the capacitance.

12. The method of claim 10, wherein detecting the change in the capacitance comprises measuring the resulting signal using an active amplifier.

13. The method of claim 10, wherein the change in the capacitance further results from displacement of a second transmitter electrode relative to the first receiver electrode, and wherein the second transmitter electrode is mechanically connected to the tip.

14. The method of claim 10, wherein the change in the capacitance further results from displacement of a second receiver electrode relative to the first transmitter electrode, and wherein the second receiver electrode is mechanically connected to the tip.

15. A capacitive displacement gauge, comprising:
a contact point;
a first electrode mechanically connected to the contact point that displaces in response to a force applied to the contact point;
a second electrode that is isolated from the contact point, wherein the first electrode and the second electrode are of different types selected from a group consisting of a transmitter electrode and a receiver electrode;
a plurality of guard electrodes adjacent to the first electrode that displace in response to the force, wherein the plurality of guard electrodes is configured to impose parallel-plate-capacitor-characteristics on a capacitor formed by the first electrode and the second electrode; and
a measurement module that detects a change in capacitance resulting from displacement of the first electrode relative to the second electrode.

16. The capacitive displacement gauge of claim 15, further comprising:
a third electrode mechanically connected to the contact point that displaces in response to the force applied to the contact point,
wherein the first electrode and the third electrode are of the same type, and
wherein the change in capacitance further results from displacement of the third electrode relative to the second electrode.

17. The capacitive displacement gauge of claim 15, further comprising:
a guard electrode surrounding the second electrode that is isolated from the contact point.

* * * * *